(12) United States Patent
Auxier et al.

(10) Patent No.: US 10,968,752 B2
(45) Date of Patent: Apr. 6, 2021

(54) TURBINE AIRFOIL WITH MINICORE PASSAGE HAVING SLOPED DIFFUSER ORIFICE

(71) Applicant: RAYTHEON TECHNOLOGIES CORPORATION, Farmington, CT (US)

(72) Inventors: James Tilsley Auxier, Bloomfield, CT (US); Tracy A. Propheter-Hinckley, Rocky Hill, CT (US); Allan N. Arisi, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 90 days.

(21) Appl. No.: 16/373,008

(22) Filed: Apr. 2, 2019

(65) Prior Publication Data

US 2019/0383147 A1 Dec. 19, 2019

Related U.S. Application Data

(60) Provisional application No. 62/686,902, filed on Jun. 19, 2018.

(51) Int. Cl.
 *F01D 5/18* (2006.01)
(52) U.S. Cl.
 CPC ............. *F01D 5/186* (2013.01); *F01D 5/187* (2013.01); *F05D 2240/24* (2013.01); *F05D 2260/202* (2013.01)

(58) Field of Classification Search
 CPC ...... F01D 5/186; F01D 5/187; F05D 2240/24; F05D 2240/122; F05D 2240/304; F05D 2260/202; F05D 2260/204
 See application file for complete search history.

(56) References Cited

U.S. PATENT DOCUMENTS 3,672,787 A * 6/1972 Thorstenson ........... F01D 5/184
 416/97 R
6,402,470 B1 * 6/2002 Kvasnak ................ F01D 5/187
 415/115
7,600,966 B2 * 10/2009 Devore .................. F01D 5/186
 415/115

(Continued)

FOREIGN PATENT DOCUMENTS

EP 1091092 4/2001

OTHER PUBLICATIONS

European Search Report for European Patent Application No. 19180982.1 completed Aug. 30, 2019.

*Primary Examiner* — Brian P Wolcott
(74) *Attorney, Agent, or Firm* — Carlson, Gaskey & Olds, P.C.

(57) ABSTRACT

A turbine airfoil includes an airfoil outer wall that defines leading and trailing ends and first and second sides that join the leading and trailing ends. At least one cooling passage is embedded in the airfoil outer wall and has a radially-elongated entrance manifold, a radially-elongated diffuser orifice that opens to an exterior surface of the airfoil outer wall, and a bank of sub-passages fluidly connecting the radially-elongated entrance manifold with the radially-elongated diffuser orifice. The radially-elongated diffuser orifice is sloped relative to the radially-elongated entrance manifold.

18 Claims, 3 Drawing Sheets

(56) References Cited

U.S. PATENT DOCUMENTS

| | | | |
|---|---|---|---|
| 7,731,481 B2* | 6/2010 | Cunha | B22C 9/103 |
| | | | 416/97 R |
| 7,850,428 B2 | 12/2010 | Tibbott | |
| 8,858,175 B2* | 10/2014 | Dutta | F01D 5/186 |
| | | | 416/97 R |
| 10,352,174 B2* | 7/2019 | Heselhaus | F01D 5/186 |
| 2016/0169004 A1* | 6/2016 | Quach | F01D 5/186 |
| | | | 60/752 |

* cited by examiner

US 10,968,752 B2

TURBINE AIRFOIL WITH MINICORE PASSAGE HAVING SLOPED DIFFUSER ORIFICE

CROSS-REFERENCE TO RELATED APPLICATION

This application claims priority to U.S. Provisional Application No. 62/686,902 filed Jun. 19, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

A turbine airfoil according to an example of the present disclosure includes an airfoil outer wall defining leading and trailing ends and first and second sides joining the leading and trailing ends. The airfoil outer wall circumscribes an internal cavity, and at least one cooling passage is embedded in the airfoil outer wall. The at least one cooling passage has a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice. The radially-elongated diffuser orifice is sloped relative to the radially-elongated entrance manifold.

In a further embodiment of any of the foregoing embodiments, the radially-elongated diffuser orifice has a rhomboid shape.

In a further embodiment of any of the foregoing embodiments, the radially-elongated entrance manifold defines a forward perimeter edge and the radially-elongated diffuser orifice defines a central axis. The central axis is sloped relative to the forward perimeter edge.

In a further embodiment of any of the foregoing embodiments, the radially elongated diffuser orifice defines radially inner and outer sides and axially forward and aft sides. The radially inner and outer sides are parallel with an axial direction that corresponds to a central axis of a turbine engine.

In a further embodiment of any of the foregoing embodiments, the at least one cooling passage includes first and second cooling passages that are sloped in opposite directions.

A further embodiment of any of the foregoing embodiments includes an additional cooling passage embedded in the airfoil outer wall. The additional cooling passage also has a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice. The radially-elongated diffuser orifice of the addition cooling passage is parallel to the radially-elongated entrance manifold.

In a further embodiment of any of the foregoing embodiments, the additional cooling passage is radially between the first and second cooling passages.

In a further embodiment of any of the foregoing embodiments, radially-elongated diffuser orifices of the first and second cooling passages and of the additional cooling passage are equidistant, within 10%, from the trailing end of the airfoil outer wall.

In a further embodiment of any of the foregoing embodiments, the radially-elongated diffuser orifice is sloped at an angle of 1° to 45° relative to the radially-elongated entrance manifold.

In a further embodiment of any of the foregoing embodiments, the radially-elongated diffuser orifice is sloped at an angle relative to the radially-elongated entrance manifold. The airfoil outer wall has a span in centimeters between an inner and outer end, and a ratio of the angle to the span is from 8 to 15.

A gas turbine engine according to an example of the present disclosure includes a compressor section, a combustor in fluid communication with the compressor section, and a turbine section in fluid communication with the combustor. The turbine section has a turbine airfoil that has an airfoil outer wall defining leading and trailing ends and first and second sides joining the leading and trailing ends. The airfoil outer wall circumscribes an internal cavity, and at least one cooling passage is embedded in the airfoil outer wall. The at least one cooling passage has a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice. The radially-elongated diffuser orifice is sloped relative to the radially-elongated entrance manifold In a further embodiment of any of the foregoing embodiments, the radially-elongated diffuser orifice has a rhomboid shape.

In a further embodiment of any of the foregoing embodiments, the radially-elongated entrance manifold defines a forward perimeter edge and the radially-elongated diffuser orifice defines a central axis. The central axis is sloped relative to the forward perimeter edge.

In a further embodiment of any of the foregoing embodiments, the radially elongated diffuser orifice defines radially inner and outer sides and axially forward and aft sides. The radially inner and outer sides are parallel with an axial direction that corresponds to a central axis of a turbine engine.

In a further embodiment of any of the foregoing embodiments, the at least one cooling passage includes first and second cooling passages that are sloped in opposite directions.

A further embodiment of any of the foregoing embodiments includes an additional cooling passage embedded in the airfoil outer wall radially between the first and second cooling passages. The additional cooling passage also has a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice. The radially-elongated diffuser orifice of the addition cooling passage is parallel to the radially-elongated entrance manifold.

A turbine airfoil according to an example of the present disclosure includes an airfoil outer wall defining leading and trailing ends and first and second sides joining the leading and trailing ends. The airfoil outer wall circumscribes an internal cavity, and a plurality of cooling passages is embedded in the airfoil outer wall. Each cooling passage has a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice. The radially-elongated entrance manifolds define respective forward perimeter edges. The forward perimeter edges are substantially parallel, and at least one of the radially-elongated diffuser orifices is sloped relative to the forward perimeter edges.

In a further embodiment of any of the foregoing embodiments, the radially-elongated diffuser orifice has a rhomboid shape.

In a further embodiment of any of the foregoing embodiments, the radially elongated diffuser orifice defines radially inner and outer sides and axially forward and aft sides. The radially inner and outer sides are parallel with an axial direction that corresponds to a central axis of a turbine engine.

In a further embodiment of any of the foregoing embodiments, the at least one of the radially-elongated diffuser orifices that is sloped relative to the forward perimeter edges includes first and second cooling passages that are sloped in opposite directions.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
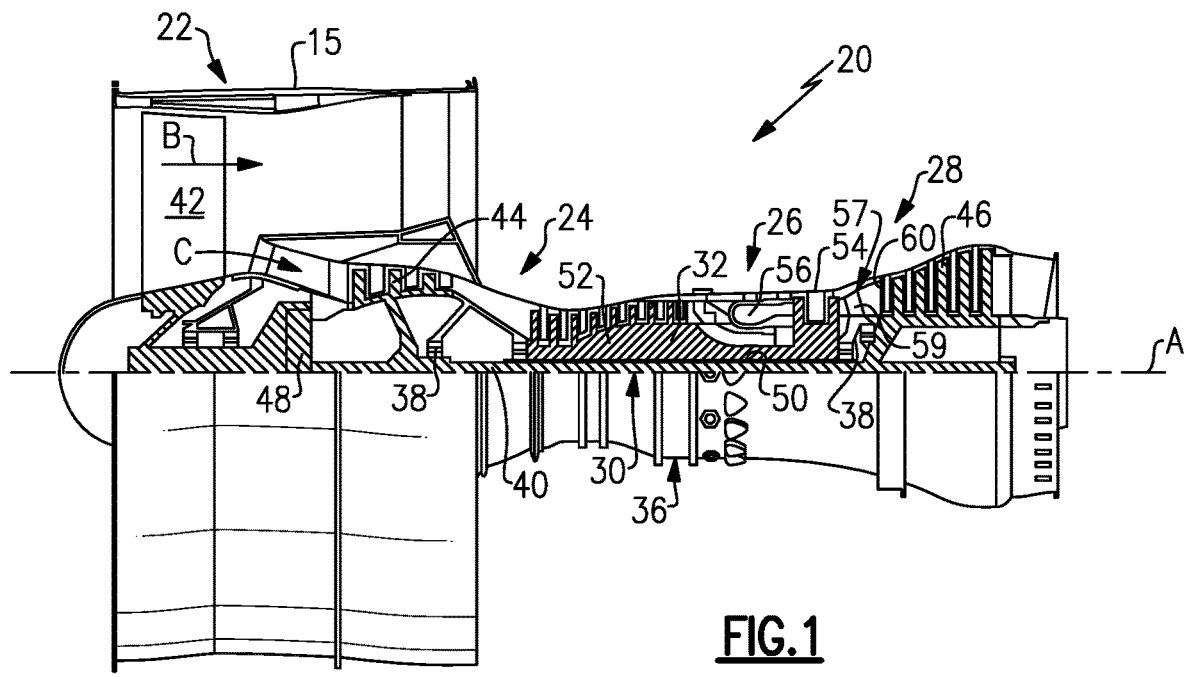
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 meters/second).

Figure 2:
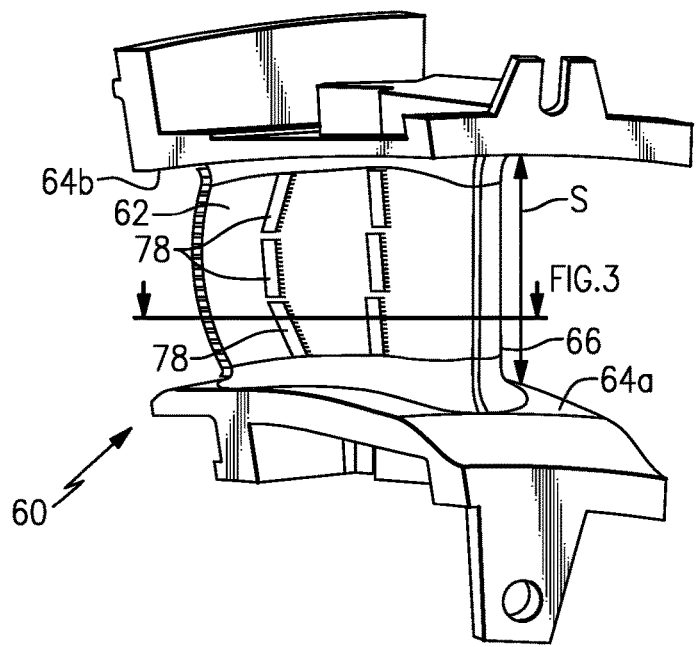
FIG. 2 illustrates an example of a turbine airfoil used in the gas turbine engine.

FIG. 2 illustrates a representative example of a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades. The turbine airfoil 60 is also shown in a cross-sectioned view in FIG. 3; and FIG. 4 shows an "inverse" or negative view of only the cores of the turbine airfoil 60 in order to illustrate cooling passages.

Figure 3:
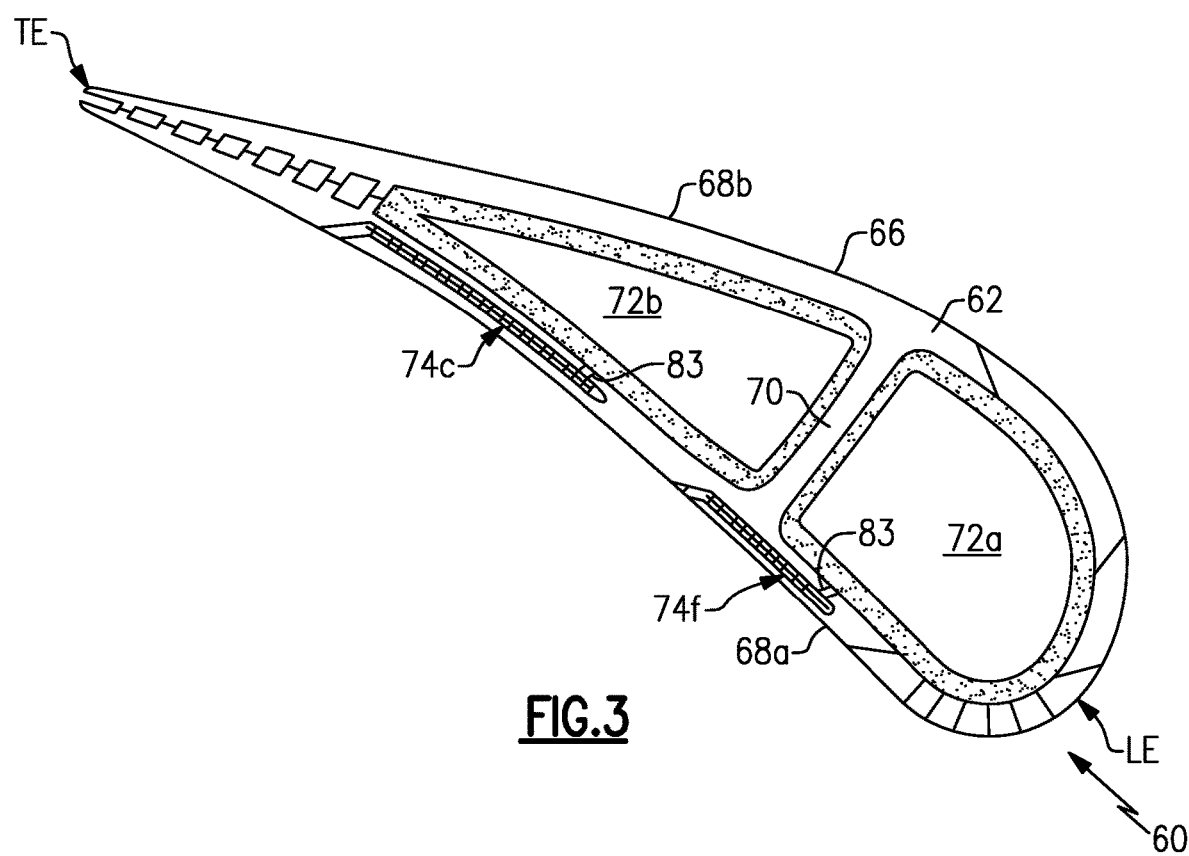
FIG. 3 illustrates a sectioned view of the airfoil of FIG. 2.
Figure 4:
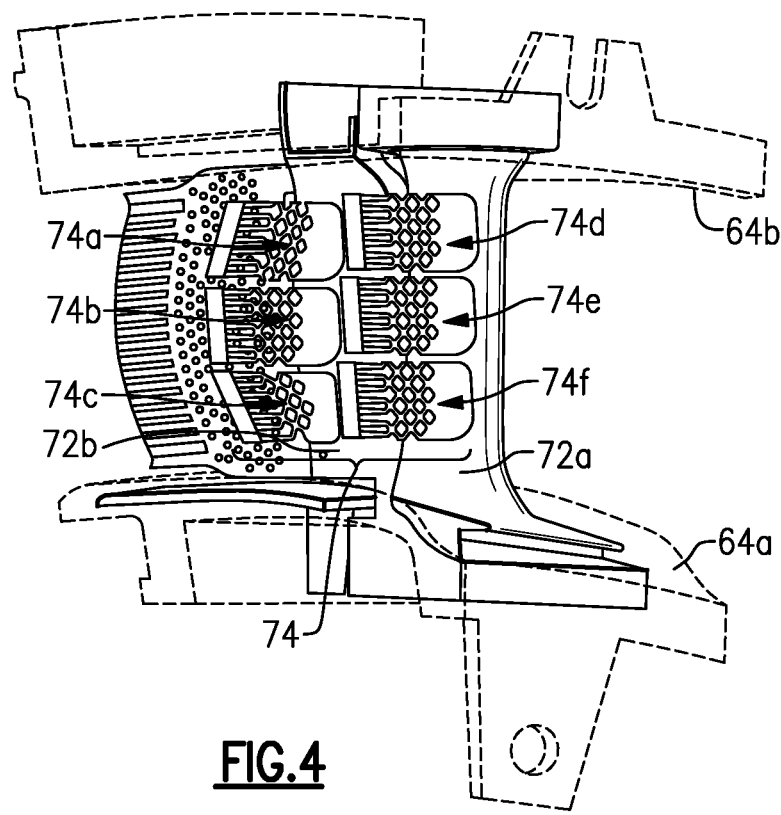
FIG. 4 shows an "inverse" or negative view of only the cores of the turbine airfoil.

Referring to FIGS. 2-4, the turbine airfoil 60 includes an airfoil section 62 that spans between inner and outer platforms 64a/64b. The airfoil section 62 includes an airfoil outer wall 66 that defines a leading end (LE), a trailing end (TE), and first and second sides 68a/68b that join the leading and trailing ends. The airfoil outer wall 66 circumscribes an internal cavity, which in this example is partitioned by a rib 70 into a forward cavity 72a and an aft cavity 72b.

There is at least one cooling passage embedded in the airfoil outer wall 66. In this example, the turbine airfoil 60 includes six such cooling passages, represented at 74a/74b/74c/74d/74e/74f (or collectively cooling passages 74), which are best viewed in FIG. 4. The cooling passages 74 may also be referred to as minicores or minicore passages. A "minicore" or "minicore passage" is a reference to the small investment casting core that is typically used to make such an embedded passage, as opposed to a main core that is used to form a main or central cavity in an airfoil.

Figure 5:
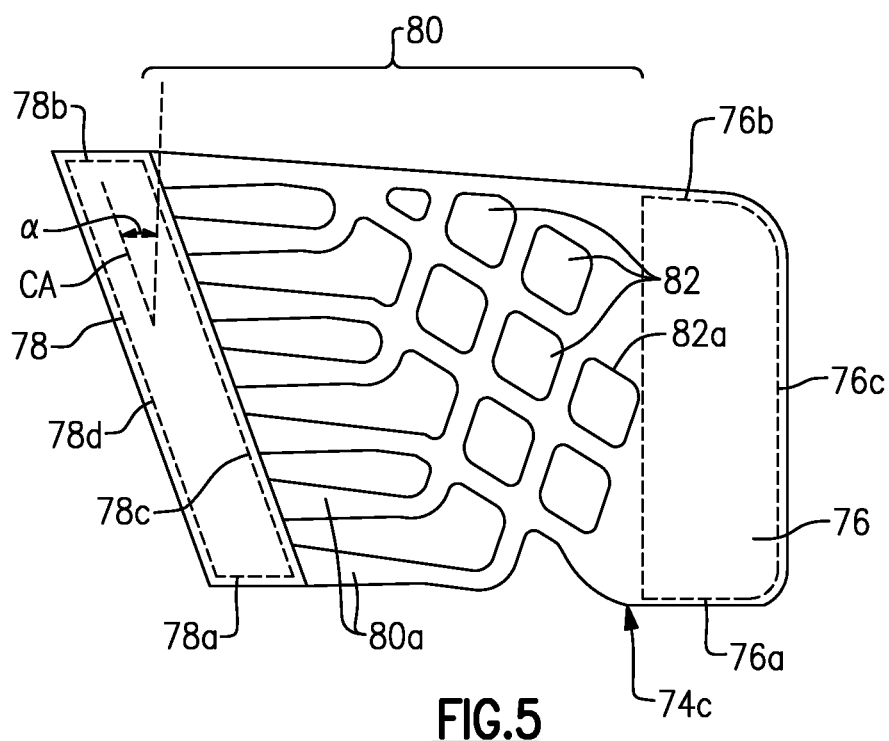
FIG. 5 illustrates an isolated view of a cooling passage of the turbine airfoil.

Referring also to FIG. 5, which shows an isolated view of the cooling passage 74c, the cooling passage 74c has a radially-elongated entrance manifold 76 that is fluidly connected to receive cooling air from the internal cavity (72b in this example), a radially-elongated diffuser orifice 78 that opens to an exterior surface of the airfoil outer wall 66, and a bank of sub-passages 80 that fluidly connects the entrance manifold 76 with the diffuser orifice 78.

The entrance manifold 76 is an open region generally defined by radially inner and outer edges 76a/76b and a forward perimeter edge 76c. The entrance manifold 76 is defined on the aft side by the first feature of the sub-passages 80, which in this example is pedestal 82a. The forward perimeter edge 76c is generally aligned with the radial direction, i.e., perpendicular to the engine central longitudinal axis A. The entrance manifold 76 is fluidly connected with the internal cavity (e.g., cavities 72a or 72b), such as by one or more ports 83 (FIG. 3).

The sub-passages 80 are defined by flow features 82 between the entrance manifold 76 and the diffuser orifice 78. The flow features may be pedestals, such as the pedestal 82a. As will be appreciated, the flow features 82 may additionally or alternatively include other types of features, such as trip strips, ribs, or fins, to direct flow and enhance cooling. The size, spacing, shape and count of the flow features 82 may be tailored to control flow through the sub-passages 80. For example, the flow can be tailored to produce a back-pressure in order to force more flow through sub-passages 80 that otherwise have less flow.

The diffuser orifice 78 includes radially inner and outer sides 78a/78b and forward and aft sides 78c/78d, and defines a central axis C. The forward side 78c is fluidly connected with outlets 80a of the sub-passages 80. In this example, the sides 78a/78b/78c/78d form a rhomboid shape. In this regard, the sides 78a/78b are parallel to each other and with the engine central longitudinal axis A, the sides 78c/78d are parallel to each other, adjacent sides are of unequal length, and all of the inside angles are non-right angles. The shape facilitates packaging of the cooling passages 74a-f in the airfoil outer wall 66.

The diffuser orifice 78 is sloped relative to the entrance manifold 76. There may be numerous ways to express such a slope but in one example, the central axis CA of the diffuser orifice 78 is sloped relative to the forward perimeter edge 76c of the entrance manifold 76. In one alternative example, the aft side 78d may be curved rather than straight. In such an example, the slope of the diffuser orifice 78 may be taken from the forward side 78c relative to the forward perimeter edge 76c. In another example, where the entire diffuser orifice is curved, the slope may be taken with regard to a tangent line to the curve in the middle one-third span of the diffuser orifice 78. The diffuser orifice 78 also has a slope angle α between the central axis CA (or aft side 78d or tangent line) and the forward perimeter edge 76c. For example, the slope angle is from 1° to 45°. In a further example, the slope angle is from 10° to 30°.

In one further alternative, where the shape of the diffuser orifice 78 is not conducive to defining a line for taking the slope angle, the axial length of the sub-passages 80 from the entrance manifold 76 to the diffuser orifice 78 can also be indicative of slope. For instance, in the cooling passage 74c, the sub-passages 80 at the inner or innermost radial side of the bank are shorter in linear distance than the sub-passages 80 at the outer or outermost side of the bank. Similarly, in the cooling passage 74a, the sub-passages 80 at the inner or innermost radial side of the bank are longer in linear distance than the sub-passages 80 at the outer or outermost side of the bank.

The slope of the diffuser orifice 78, and also the rhomboid shape of the diffuser orifice 78, may enhance cooling of the turbine airfoil 60. For instance, cooling passages within an outer wall are to provide good area coverage of the film cooling emitted from the diffuser orifices over the exterior surfaces; however, having the diffuser orifices too close to the trailing edge sacrifices coverage and thus cooling performance By having one or more sloped cooling passages, such as cooling passage 74c (and, as shown in FIG. 4, also 74a), the cooling passages 74a-f can be arranged so that the diffuser orifices 78 are equidistant from the trailing edge TE. Furthermore, the rhomboid shape facilitates close radial spacing of the cooling passages 74a-f.

For instance, the turbine airfoil 60 has six cooling passages 74a-f, including three aft cooling passages 74a-c and three forward cooling passages 74d-f. In this example, of the three aft cooling passages 74a-c, cooling passages 74a and 74c are sloped and cooling passage 74b is non-sloped. In the non-sloped cooling passage 74b, the slope angle α is zero or substantially zero between the central axis CA (or aft side 78d or tangent line) and the forward perimeter edge 76c. The sloped cooling passages 74a and 74c are sloped in opposite directions. That is, relative to their respective inner sides 78a, one slopes forward and the other slopes aft. The arrangement of sloped and non-sloped cooling passages 74a-c permits the diffuser orifices 78 of the aft cooling passages 74a-c to be equidistant from the trailing edge TE. In a further example, the diffuser orifices 78 of the aft cooling passages 74a-c are equidistant, within 30%, or in a further example within 20%, from the trailing edge TE at each point along the aft sides 78d.

The slope of one or more of the diffuser orifices 78 also facilitates packing the cooling passages 74a-c in a relatively small airfoil section 62, yet providing good cooling performance. For example, the airfoil section 62 may have a relatively short span between the inner and outer platforms 64a/64b. This, and the curvature of the trailing edge TE presents packaging challenges for cooling passages. For instance, it may be difficult to provide good cooling coverage using all straight, rectangular diffuser orifices because the orifices would be unevenly spaced apart and may impinge into the fillet area of the airfoil. However, using sloped diffuser orifices 78, such as in the cooling passages 78a/78c, equidistance to the trailing edge TE can be better maintained to, in turn, provide better cooling coverage and performance.

The relationship between the span and the slope can be represented by a ratio of the slope angle to the span. For example, the diffuser orifice 78 has a slope angle α between the central axis CA and the forward perimeter edge 76c, the airfoil outer wall 66 has a span S (in centimeters) between an inner and outer end at the inner and outer platforms 64a/64b, and a ratio of the slope angle to the span (in inches) is from 8 to 15. In a further example, the slope angle is also no greater than 45° and the span is no greater than 1.75 inches (4.45 centimeters).

As used herein, terms such as "radially-elongated" and "axial" refer to directionality with regard to the engine central longitudinal axis A. Moreover, such directionality applies even if a turbine airfoil is separated from an engine, since such airfoils are designed to span in the radial direction and generally extend from the leading to trailing edges along the axial direction. Additionally, orientations such as "forward" and "aft" refer to the flow of gas through the engine from the front of the engine 20 at the fan section 22 to the back of the engine at the low pressure turbine 46.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A turbine airfoil comprising:
   an airfoil outer wall defining leading and trailing ends and first and second sides joining the leading and trailing ends, the airfoil outer wall circumscribing an internal cavity; and
   at least one cooling passage embedded in the airfoil outer wall, the at least one cooling passage having a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice, the radially-elongated diffuser orifice is sloped relative to the radially-elongated entrance manifold, the radially-elongated diffuser orifice is sloped at an angle relative to the radially-elongated entrance manifold, the airfoil outer wall has a span in centimeters between an inner and outer end, and a ratio of the angle to the span is from 8 to 15.

2. The turbine airfoil as recited in claim 1, wherein the radially-elongated diffuser orifice has a rhomboid shape.

3. The turbine airfoil as recited in claim 1, wherein the radially-elongated entrance manifold defines a forward perimeter edge and the radially-elongated diffuser orifice defines a central axis, wherein the central axis is sloped relative to the forward perimeter edge.

4. The turbine airfoil as recited in claim 1, wherein the radially elongated diffuser orifice defines radially inner and outer sides and axially forward and aft sides, wherein the radially inner and outer sides are parallel with an axial direction that corresponds to a central axis of a turbine engine.

5. The turbine airfoil as recited in claim 1, wherein the at least one cooling passage includes first and second cooling passages that are sloped in opposite directions.

6. The turbine airfoil as recited in claim 5, further comprising an additional cooling passage embedded in the airfoil outer wall, the additional cooling passage also having a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice, wherein the radially-elongated diffuser orifice of the additional cooling passage is parallel to the radially-elongated entrance manifold.

7. The turbine airfoil as recited in claim 6, wherein the additional cooling passage is radially between the first and second cooling passages.

8. The turbine airfoil as recited in claim 1, wherein the radially-elongated diffuser orifice is sloped at an angle of 1° to 45° relative to the radially-elongated entrance manifold.

9. A gas turbine engine comprising:
   a compressor section;
   a combustor in fluid communication with the compressor section; and
   a turbine section in fluid communication with the combustor,
   the turbine section having a turbine airfoil that includes
      an airfoil outer wall defining leading and trailing ends and first and second sides joining the leading and trailing ends, the airfoil outer wall circumscribing an internal cavity, and
      at least one cooling passage embedded in the airfoil outer wall, the at least one cooling passage having a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice, the radially-elongated diffuser orifice being elongated along a central axis extending between radially inner and outer sides of the radially-elongated diffuser orifice, the radially-elongated entrance manifold defining a forward perimeter edge that extends in a radial direction, and the central axis of the radially-elongated diffuser orifice is continuously sloped relative to the forward perimeter edge of the radially-elongated entrance manifold in the radial direction.

10. The gas turbine engine as recited in claim 9, wherein the radially-elongated diffuser orifice has a rhomboid shape.

11. The gas turbine engine as recited in claim 9, wherein the radially elongated diffuser orifice defines axially forward and aft sides, wherein the radially inner and outer sides are parallel with an axial direction that corresponds to a central axis of a turbine engine.

12. The gas turbine engine as recited in claim 9, wherein the at least one cooling passage includes first and second cooling passages that are sloped in opposite directions.

13. The gas turbine engine as recited in claim 12, further comprising an additional cooling passage embedded in the airfoil outer wall radially between the first and second cooling passages, the additional cooling passage also having a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice, wherein the radially-elongated diffuser orifice of the additional cooling passage is parallel to the radially-elongated entrance manifold.

14. A turbine airfoil comprising:
an airfoil outer wall defining leading and trailing ends and first and second sides joining the leading and trailing ends, the airfoil outer wall circumscribing an internal cavity; and
a plurality of cooling passages embedded in the airfoil outer wall, each said cooling passage having a radially-elongated entrance manifold fluidly connected to receive cooling air from the internal cavity, a radially-elongated diffuser orifice that opens to an exterior surface of the airfoil outer wall, and a bank of sub-passages fluidly connecting the radially-elongated entrance manifold with the radially-elongated diffuser orifice, each said radially-elongated entrance manifold defining a forward perimeter edge, and the radially-elongated diffuser orifice is sloped at an angle relative to the forward perimeter edge, the airfoil outer wall has a span in centimeters between an inner and outer end, and a ratio of the angle to the span is from 8 to 15.

15. The turbine airfoil as recited in claim 14, wherein the radially-elongated diffuser orifice has a rhomboid shape.

16. The turbine airfoil as recited in claim 14, wherein the radially elongated diffuser orifice defines radially inner and outer sides and axially forward and aft sides, wherein the radially inner and outer sides are parallel with an axial direction that corresponds to a central axis of a turbine engine.

17. The gas turbine as recited in claim 1, wherein the radially-elongated diffuser orifice is sloped at an angle of 10° to 30° relative to the forward perimeter edge of the radially-elongated entrance manifold.

18. The gas turbine engine as recited in claim 17, wherein the trailing end is convex.

* * * * *